United States Patent [19]

Öberg

[11] 3,918,692

[45] Nov. 11, 1975

[54] APPARATUS FOR REFINING MOLTEN METALS AND MOLTEN METAL REFINING PROCESS

[75] Inventor: Karl Erik Öberg, Borlange, Sweden

[73] Assignee: Uddeholms AB, Hagfors, Sweden

[22] Filed: Mar. 11, 1974

[21] Appl. No.: 450,234

[30] Foreign Application Priority Data

Mar. 12, 1973 Sweden............................ 7303382

[52] U.S. Cl........................................ 266/35; 13/2
[51] Int. Cl.².......................................... C21C 5/42
[58] Field of Search............ 13/2, 29, 30; 75/60, 63, 75/51, 52; 266/35, 36 P, 36 H, 41

[56] References Cited
UNITED STATES PATENTS

| | | | |
|---|---|---|---|
| 1,031,257 | 7/1912 | Greene................................. | 13/29 |
| 1,769,223 | 7/1930 | Isliker................................ | 75/63 X |
| 1,958,581 | 5/1934 | Kennicott............................ | 266/35 |

FOREIGN PATENTS OR APPLICATIONS 22,777 10/1896 United Kingdom................... 266/35

*Primary Examiner*—Gerald A. Dost
*Attorney, Agent, or Firm*—Cushman, Darby & Cushman

[57] ABSTRACT

Apparatus suitable for injecting fluids, particularly suspensions of solids in gases, below the surface of a molten metal, e.g. in emulsion metallurgy, comprises a converter having a tuyere for injecting the fluid below the surface of the molten metal, and a heating zone, spaced away from the converter but in liquid communication with the converter at a level below the surface of the molten metal, the heating zone having a thinner lining than the converter and being heated by electric induction heating so that a temperature gradient can be set up between the heating zone and the converter to maintain the temperature of the molten metal in the converter. The apparatus can be used for desulphurisation or decarburization of steel, the reduction of reducible metal oxides by emulsion reduction, the introduction of alloying components or the introduction of endothermally reacting gases into molten metals.

9 Claims, 2 Drawing Figures

U.S. Patent  Nov. 11, 1975  3,918,692
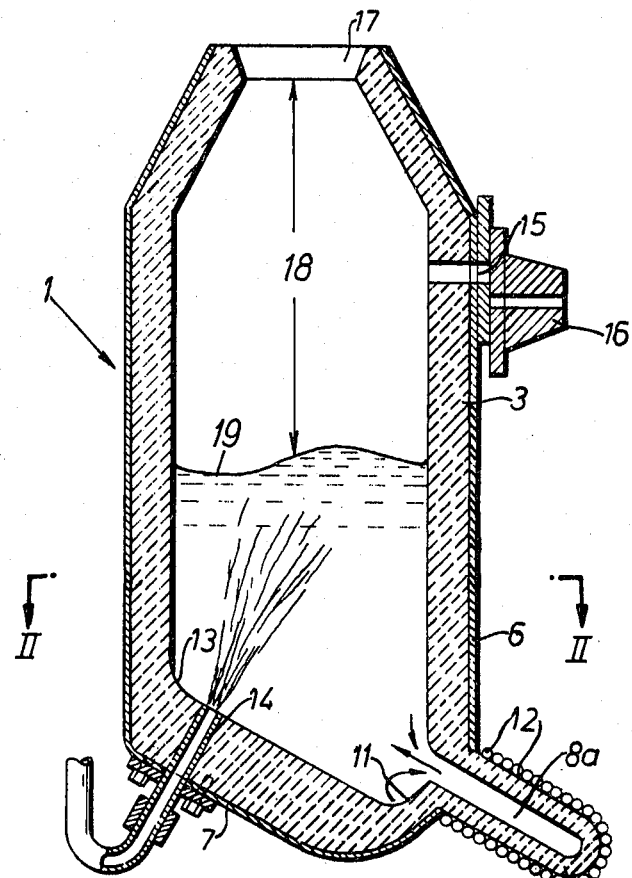
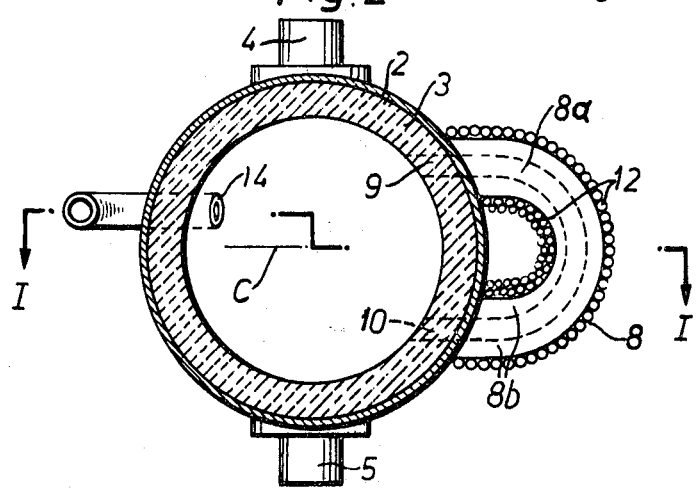

APPARATUS FOR REFINING MOLTEN METALS AND MOLTEN METAL REFINING PROCESS

The present invention relates to apparatus for treating molten metals with gas/solid suspensions or other fluids, particularly introducing suspensions of solid powders dispersed in gases, into the molten metal and processes of treating molten metals using the apparatus.

Numerous metallurgical processes exist which involve the injection into the molten metal of one or two phases which are disperesed in a fluid matrix phase. One area in which such processes are particularly important is so-called emulsion metallurgy. Processes in this area take advantage of the intensive contact between metal, slag and gas which can be obtained in fully dispersed systems and are particularly useful for iron and steel making- and refining processes. Such processes in which suspensions of powders in fluid phases are introduced below the surface of the molten metal thus give greater reaction surfaces compared with processes in which the reactant to be introduced is placed on top of the melt.

One of the major problems in operating such metallurgical processes is the maintenance of the temperature of the molten metal as the introduction of the suspension causes considerable temperature reduction in the molten metal. The same problem may also often arise when introducing endothermically reacting gases into the metal. Of course, it is possible to use conventional heating means to heat the whole bulk of the metal being treated, e.g. blowing with oxygen to oxidise a component of the melt, but introduction of oxygen is not always desired and in practice, electrical heating means are preferred. Conventional arc furnaces do not use electrical energy efficiently. Electrical induction heating makes much more efficient use of electrical energy than electric arc furnaces but induction heating of the whole contents of a converter would require capital expenditure of a size that would be difficult to justify on an industrial scale, having regard to the energy available from electricity and present day electrical energy costs. The comparatively high electrical efficiency of induction heated vessels requires a thin lining of the vessel. A thin lining in a reaction vessel is, however, for practical reasons, not desirable due to the risk of damage caused by the wear on the lining during use. However, if the thickness of the lining is increased, the high electrical efficiency will be lost.

We have now found that it is possible to take advantage of the benefits of electric induction heating without having to meet the problems of surrounding the whole converter with induction heating coils, by modifying the design of a conventional converter suitable for introducing gas/powder suspensions or other fluid materials below the surface of the molten metal.

The present invention provides apparatus for treating a molten metal with a gas/solid suspension or other fluid comprising a refractory lined, tiltable converter for holding the molten metal, said vessel having a wall and a bottom; means for introducing the metal to be treated and means for removing the metal after treatment; at least one tuyere for introducing the gas/solid suspension or other fluid into the coverter, said tuyere extending through the bottom or wall of the vessel at a level that will be below the surface of the molten metal when the converter is in its vertical operating position; the refractory lining of the converter being of sufficient thickness to resist wear during operation; said converter having a freeboard space of height which will be at least equal to the depth of the molten metal during operation, to allow for splashing and foaming during operation; said converter having at least one heating zone spaced away from the converter; the heating zone having at least one channel in liquid communication with the converter, the channel opening into the converter at a level that will be below the surface of the molten metal when the coverter is in its vertical operating position; said heating zone having a refractory lining which is thinner than the refractory lining of the converter, and having means for heating the contents of the zone by electric induction heating, to an extent such that a temperature gradient can be established between the contents of the zone and the contents of the converter.

The exact dimensions of the heating zone are not critical, but it is necessary that a relatively small fraction of the total molten metal in the apparatus be located in the heating zone so that it can be induction heated to a temperature sufficiently above that of the main bulk of the molten metal to provide a sufficient temperature gradient to maintain or raise the bulk of the molten metal at, or to, the desired temperature. To obtain maximum benefit from this temperature gradient, it is desirable to position the tuyere so that the flow of the gas/solid suspension or other fluid injected through the tuyere will meet the heat flow from the heating zone in the region outside the opening of said channel or channels.

We have found it convenient to utilize a heating zone which is part of a loop formed by a channel between two openings in the converter wall or bottom, the molten metal in the converter inter-connecting the two channel openings. Preferably the channel openings penetrate the converter wall or bottom at the same level. It is also possible to operate with more than one loop or to use a simple extension of the main converter having a single liquid communication to the main converter. Whatever the exact physical form of the heating zone, it is advantageous to have the heating zone completely encircled by the induction heated windings.

For reasons associated with the need to minimize the erosion of the lining of the converter, the converter may have an inclined bottom, that is to say, inclined at an angle to the sides, but also vessels having a flat bottom perpendicular to the sides may be used.

The mouth of the tuyere, or tuyeres, is located in the region of the flow of hotter metal from the heating zone. This arrangement reduces the risk of freezing of the molten metal in the region of the tuyere.

Preferably the tuyere, or tuyeres, are positioned so that the fluid introduced through the tuyere does not enter the heating zone. This arrangement reduces the risk of damage on the thin lining of the heating zone. Most conveniently, the tuyere is directed so that any solid particles entrained in a carrier fluid and injected through the tuyere will sweep over the region outside the channel opening or channel openings without entering the heating zone.

The reaction vessel is preferably tiltable in a manner such that the molten metal can be removed from the vessel without removing molten metal from the heating zone.

The converter may otherwise by constructed in accordance with conventional design and be dimensioned conventionally. This means that the converter has a sufficient lining thickness to resist the severe wear during operation. Further the converter has a sufficient freeboard above the surface of the molten metal to allow splashing and foaming of slag and metal during operation. The freeboard height herein preferably is at least equal with the depth of the molten metal during operation.

In accordance with a further aspect of the present invention, a process is provided for treating a molten metal with a gas/solid suspension or other fluid, which comprises maintaining a body of molten metal in a refractory lined, tiltable converter, introducing the gas/solid suspension or other fluid through a tuyere at a level below the surface of the molten metal, and maintaining the metal in a molten state during the treatment by heating metal in a heating zone which is spaced away from the vessel but has at least one liquid communication channel with the vessel, the channel opening into the vessel at a level below the surface of the molten metal the heating zone being heated by electric induction heating means to an extent such that a temperature gradient is established between the contents of the zone and the contents of the converter.

In the accompanying drawings,

FIG. 1 shows a vertical section through a converter constructed in accordance with the invention and illustrates, schematically the principle constructions of the converter, and FIG. 2 shows a horizontal section II—II through the same converter.

The invention will first be explained in more detail with reference to FIGS. 1 and 2 of the accompanying drawings.

The converter, generally designated 1, has side walls 6, an inclined bottom 7 and charging port 17. The converter itself consists of a steel casing 2 lined on the inside with a refractory lining 3. The thickness of the lining 3 is sufficient to resist the wear during operation of the apparatus. Axle bars 4 and 5 are mounted in bearings (not shown) so that the converter can be tilted about an axis running through axle bars 4 and 5. A melting loop 8 is provided at the junction of side wall 6 and the lower end of the sloping bottom 7. Loop 8 comprises a channel 8a extending between two openings 9 and 10 into the main body of the converter through the converter side wall 6. Openings 9 and 10 are at the same level in side wall 6 just above where side wall 6 joins to the lower end of sloping bottom 7 at 11. The channel 8a is encircled by induction windings 12 for heating the contents of the channel 8a. The channel 8a has a refractory lining 8b which is water cooled and considerably thinner than the lining 3 of the vessel to ensure a high heating efficiency of the induction unit.

Tuyere 14 is located in the upper end of inclined bottom 7 and opens perpendicularly to inclined bottom 7 but is displaced from the plane of symmetry C in order to bring about a state of dissymmetry to cause vigorous stirring of the metal without excessive splashing during operation. However, the vessel 1 is provided with a freeboard 18 above the surface 19 of the molten metal to allow such splashing and foaming which in unavoidable during the performance of some emulsion metallurgic reactions. According to the embodiment shown in FIGS. 1 and 2, freeboard 18 has a height about equal with the depth of the molten metal during operation.

A powder dispenser (not shown) fluidizes the powder to be introduced into the converter and the suspension of powder is then transported by the carrier gas and fluidizing gas to tuyere 14. The fluidizing gas can be of the same type as the carrier gas or a different gas. It is also possible to use dispensers in which the entire carrier gas is used to fluidize the powder. In the case where the molten metal is to be reacted with a fluid in the form of a liquid or gas not containing solids, the fluid can be introduced through tuyere 14 in the same way. Tuyere 14 can also be placed in the plane of symmetry C in which case, if the melting loop 8 is placed symmetrically with respect to plane of symmetry C, there is maximum heating in the region of the mouth of the tuyere. A tap hole 15 is provided in the converter wall above the anticipated slag line and on the same side of the converter wall as loop 8. This tap hole may be kept closed by a slide gate 16 while the converter is operating.

In operation, converter 1 is charged with an adequate quantity of metal to be treated. Normally, the heating loop 8 is kept filled with metal which is maintained in a molten state by passing electricity through induction heating coils 12. The metal to be treated can either be charged in the molten state into the converter vessel through the charging port 17, or in the solid state through the charging port 17 and melted in the vessel starting from a starting melt in the melting loop 8. It can also be introduced in the form of an oxide which is reduced in the converter. The heating during operation of the coverter is normally arranged so that a temperature of the molten metal in heating channel 8a is about 50 to 200°C higher than that of the main body of metal in converter 1. When the desired temperature conditions have been achieved in the converter, the powder/gas suspension (or other gas liquid or other fluid to be brought in contact with the molten metal in the converter), is introduced into the molten metal through tuyere 14. Introduction of the powder dispensed in the carrier gas brings about considerable cooling of the molten metal in a region of the tuyere mouth but these heat losses are compensated for by the flow of hot metal from the heating loop 8. By adjusting the input of electric power to the induction heating unit, i.e. to the induction winding 12, the temperature of the molten metal in the heating channel 8a is maintained at about 50° to 200°C higher than that of the metal in the converter outside the openings 9 and 10 of the channel 8a. By this means an effective heat transport from the channel to the bulk of molten metal in the converter is achieved. Tuyere 14 is located on that side of the converter 1 which is opposite that side of the converter where the heating channel 8a is located. Tuyere 14 is directed towards a point in the converter wall 6 above the openings 9 and 10 to the channel 8a. By this arrangement, the hot metal in the region outside openings 9 and 10 will effectively be replaced by colder metal from other parts of the bulk of molten metal in the converter 1 and possibly to a certain degree also by fluid injected through tuyere 14, which improves the heat exchange between channel 8a and the bulk of molten metal in the converter 1. Moreover, the hot metal from the heating channel 8a is distributed rapidly throughout the body of molten metal in the converter which is important for the kinetics of the metal treatment processes. A further advantage of the interaction between the hot metal from heating channel 8a and the suspension or other fluid injected through tuyere 14 is that the metal from heating channel 8a prevents the tuyere mouth from freezing while the cooling effect brought about by the injected suspension or other fluid protects the furnace lining 3 adjacent to openings 9 and 10 of channel 8a so that the lining in this region is not eroded too quickly.

At the end of the treatment, the converter may be tapped through hole 15. This is achieved by tilting the furnace about the axis passing through axle bars 4 and 5 until tuyere 14 is exposed above the metal surface, and then opening sliding gate 16. Tapping the furnace in this way ensures that melting loop 8 will not be emptied. Alternatively, if it is desired also to empty melting loop 8, perhaps because the converter is to be used for a different metal treatment process, or for a different metal alloy in the next run, then the furnace can be tapped by tilting it further and emptying it through port 17. Slag may be removed before the bulk metal is tapped through port 17 by conventional methods. Because tuyere 14 is exposed above the surface of the metal during tapping operation and is inclined relative to the converter wall 6, it is possible to introduce air, argon, nitrogen or other gases which will move the slag layer towards the port 17 and thus facilitate the slag removal.

A typical sequence of operation of the apparatus is the following. The molten metal to be treated is charged into converter 1 through the port 17 such that at least half the height of the converter is left as freeboard 18. The temperature of the molten metal is measured, and if necessary for the treatment in hand, raised by adjusting the supply of electric power to the induction windings 12. When the desired temperature has been reached in the molten metal, the selected fluid is injected through tuyere 14. If the fluid is a suspension of powder in a gas, the suspension is first prepared in a powder dispenser and fed through a conduit to tuyere 14. According to the embodiment shown in FIGS. 1 and 2, tuyere 14 is directed at a point above the channel 8a. This, in combination with an adequate injection velocity, enables a quick replacement of metal outside the channel 8a in accordance with the principles of the invention without any powder or other agents from tuyere 14 entering the channel. Freezing of tuyere 14 is avoided by the flow of heat from the heating zone in the channel 8a. The temperature in the molten metal is controlled and if necessary adjusted by adjusting the input of electric energy to the induction windings 12. When the treatment of the metal is finished, the injection of the fluid is stopped and, after adjusting the chemical composition, if necessary, the converter is tilted so that metal can be removed through tap hole 15. During this operation, an inert gas or possibly air, nitrogen or other fluids may preferably be injected through tuyere 14, which during the tapping is exposed above the surface of the molten metal. Before tapping, the slag usually is removed through port 17, and blowing through tuyere 14 facilitates slag removal in a manner above described. Usually, molten metal is retained in the channel 8a and in the bottom of the converter so that the openings 9 and 10 of the channel are interconnected to form a closed loop 8.

Although the apparatus described above has a single melting loop, it is possible to provide the converter with more than one loop of the type illustrated in FIGS. 1 and 2. Moreover, it is not essential that the induction heating zone be in the form of a loop with two channel endings at the converter wall; it can be a single induction heating zone having a single opening at the converter wall. It is also possible to provide more than one tuyere in the wall or bottom of the converter in combination with one or more heating channels which conveniently are arranged opposite the tuyere, wherein at least one tuyere is directed towards a region above each of the channels terminating in the converter wall or bottom.

The apparatus can be used for carrying out various treatments of molten metal with a fluid which is injected beneath the surface of the molten metal. Particularly, however, the apparatus is designed for use in emulsion metallurgy techniques for carrying out various metallurgical reactions konw per se or for introducing different alloying components into the molten metal. For example, the apparatus may be used for the desulphurization of steel using a suspension of CaO or $CaC_2$-powders entrained in a carrier gas. Another important field of the application is emulsion decarburization of molten iron or steel, in which a suspension of iron ore concentrate in a carrier gas is injected into the molten iron or steel. Other agents which may be injected into the molten metal in the form of powdered solids dispersed in a carrier gas, are various slags used for dephosphorization or for the transformation of hard (i.e. undeformable in hot forming conditions) undesired inclusions in the metal to soft tolerable inclusions. The apparatus also can be used for direct production of iron or other metals or alloys by emulsion reduction. In this procedure carbon and an appropriate metal oxide powder are injected through the tuyere by the carrier gas. Another application of the apparatus of the invention is in alloying of metals with certain elements which may be difficult to introduce into the metal in high yield by conventional techniques, and also still further application is the injection of endothermally reacting gases, such as steam (water vapour).

The following Examples are given to illustrate the invention.

EXAMPLE 1

It is known to refine steel and iron with lime and iron oxide to reduce its phosphorous content. This example describes how lime and iron oxide can be injected into and emulsified with molten metal according to the invention. In the example, the molten metal was molten pig iron. The powder used in the example contained 80% by weight calcium oxide and 20% by weight iron oxide ($Fe_2O_3$). 1.08% by weight of the particles had sizes larger than 1.00 mm and 14.58% by weight had sizes smaller than 0.06 mm. Thus 84.34% by weight of the mixture had particle sizes between 0.06 and 1.00 mm. There were no particles larger than 1.5 mm. in the mixture.

The treatment was carried out in apparatus schematically illustrated in FIGS. 1 and 2. 5 metric tons of the molten pig iron were introduced into the converter, the induction heating started and a flow of argon at the rate of 4 liters per minute was introduced through tuyere 14. By supplying electric power to the induction windings 12, the temperature of the pig iron in the converter was increased, and when the temperature of the main mass of the pig iron in the converter had reached 1500°C., the calcium oxide/iron oxide mixture was dispersed in argon in a powder dispenser not shown in the Figures, and the suspension was fed through a conduit to tuyere 14 and injected through tuyere 14 into the molten metal. In this way 170 kg. of the calcium oxide/iron oxide mixture was introduced into and emulsified in the molten pig iron in the converter over a period of 15 minutes. During the treatment, the temperature in the molten pig iron in the converter was controlled and kept approximately constant by adjusting the electric powder supplied to the induction unit surrounding the heating zone in channel 8a. At the end of the treatment period, the temperature of the pig iron was 1497°C. Blowing with argon was continued for a further 15 minutes and the converter was then tilted and tapped through tap hole 15.

EXAMPLE 2

This example describes the decarburization of pig iron using iron ore concentrate in apparatus illustrated in FIGS. 1 and 2. The converter was charged with about 4.5 metric tons of molten pig iron having the following composition by weight:

3.63% C, 1.64% Si, 0.21% Mn, 0.008% P, 0.009% S; balance iron and incidental impurities. The temperature of the pig iron in the converter was raised to 1480°C. by supplying electric power to the induction windings 12. A suspension of magnetite ore concentrate ($Fe_3O_4$) in argon was injected through the tuyere over a total period of 135 minutes. A total quantity of 1.250 kg. $Fe_3O_4$ was introduced and emulsified in the iron in the converter. The temperature of the metal in the converter was controlled and kept well above its melting point to ensure that the tuyere was not blocked from frozen metal. The electrical power input was varied from about 600 kW to about 1,000 kW so that the temperature of the molten metal varied from about 1420 to about 1520°C. The final composition by weight of the steel obtained in the converter, prior to tapping, was the following:

0.73% C, 0.01% Si, 0.01% Mn, 0.008% P, 0.010% S; balance iron and incidental impurities.

I claim:

1. Apparatus for treating a molten metal with a gas/solid suspension comprising a refractory lined, tiltable converter for holding the molten metal, said vessel having a wall and a bottom and being tiltable about an axle bar; means for introducing the metal to be treated and means for removing the metal after treatment; at least one tuyere for introducing the gas/solid suspension into the converter, said tuyere extending through the bottom or wall of the vessel at a level that will be below the surface of the molten metal when the converter is in its vertical operating position; the refractory lining of the converter being of sufficient thickness to resist wear during operation; said converter having at least one heating zone spaced away from the converter, the heating zone having at least one channel in liquid communication with the converter, the channel opening into the converter at a level that will be below the surface of the molten metal when the converter is in its vertical operating position, and essentially in the region of that point in the vessel which is the deepest point when the converter is in its vertical operating position, said heating zone having a refractory lining which is thinner than the refractory lining of the converter, and having means for heating the contents of the zone by electric induction heating to an extent such that a temperature gradient can be established between the contents of the zone and the contents of the converter and wherein the bottom of the vessel is inclined at an oblique angle with respect to at least one side of the vessel so that the vessel tapers towards the deepest point of the vessel, in the region of which the channel opening is located, when the converter is in its vertical operating position.

2. Apparatus according to claim 1, wherein the tuyere, is positioned such that the suspension introduced through the tuyere does not enter the heating zone.

3. Apparatus according to claim 2, wherein the tuyere and the heating channel are located in the converter wall on opposite sides of a plane containing the axle bar and perpendicular to the axle bar when the converter is in its vertical operating position.

4. Apparatus according to claim 1, wherein the tuyere is directed such that any solid particles entrained in a carrier fluid injected through the tuyere will sweep through a region outside the channel openings without entering the heating zone.

5. Apparatus according to claim 1, wherein the converter is tiltable so that molten metal can be removed from the converter without removing molten metal from the heating zone.

6. Apparatus according to claim 5, wherein a tap hole is provided in the converter wall above the anticipated slag line, and that the heating channel is located between the tap hole and the tuyere.

7. Apparatus according to claim 1, wherein the channel is part of a loop.

8. Apparatus according to claim 7, wherein the openings of the channel in the converter wall or bottom are at the same level.

9. Apparatus according to claim 1, wherein the heating zone of the channel is completely encircled by induction heating windings.

* * * * *